(12) United States Patent
Koshino et al.

(10) Patent No.: US 6,370,100 B2
(45) Date of Patent: *Apr. 9, 2002

(54) DISC TRANSFER MECHANISM FOR AN INFORMATION DISC DRIVE

(75) Inventors: Katsuhiko Koshino, Neyagawa; Takeshi Nakamura, Hirakata, both of (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,591

(22) Filed: Jan. 28, 1999

(30) Foreign Application Priority Data

Jan. 30, 1998 (JP) .......................................... 10-017606

(51) Int. Cl.⁷ ................................................ G11B 17/04
(52) U.S. Cl. ...................................................... 369/77.1
(58) Field of Search .......................... 360/97, 98, 99.02, 360/99.06, 105; 369/75.1, 75.2, 77.1, 77.2, 36, 37, 39; 206/45.13, 309

(56) References Cited

U.S. PATENT DOCUMENTS

| 4,701,823 A | * | 10/1987 | Sakurai ....................... 360/106 |
| 4,805,770 A | * | 2/1989 | Grobecker et al. .......... 206/309 |
| 4,831,477 A | * | 5/1989 | Sakamoto et al. ......... 360/99.06 |
| 4,926,406 A | * | 5/1990 | Ikedo et al. ................... 369/36 |
| 5,038,331 A | * | 8/1991 | Ogawa .......................... 369/36 |
| 5,140,579 A | * | 8/1992 | Suzuki et al. ............... 369/77.1 |
| 5,737,285 A | * | 4/1998 | Uchiyama .................... 369/34 |
| 5,933,400 A | * | 8/1999 | Kabasawa .................. 369/77.2 |

* cited by examiner

Primary Examiner—Brian E. Miller
Assistant Examiner—Tianjie Chen
(74) Attorney, Agent, or Firm—Parkhurst & Wendel, L.L.P.

(57) ABSTRACT

A disc transfer mechanism that allows a disc to be reliably installed and removed, which includes a damper device between a base and a tray to reduce the moving speed of the tray using the urging force of a spring. The damper device includes a first damper interposed between the tray and the base to reduce the tray moving speed during all tray moving steps, and a second damper that operates separately from the first damper during the step of delivering a disc set on a turntable to the tray.

2 Claims, 12 Drawing Sheets

DISC TRANSFER MECHANISM FOR AN INFORMATION DISC DRIVE

FIELD OF THE INVENTION

The present invention relates to a disc transfer mechanism having a tray used to install and eject a disc.

BACKGROUND OF THE INVENTION

The disc transfer mechanism described in Japanese Patent Application Laid-Open No. 63-191361 has a tray that moves in the horizontal direction between a disc installation and removal position at which a disc has been drawn out from the apparatus and a position at which the disc has been drawn into the apparatus body; and a disc holder provided on the tray and on which the disc is placed.

The apparatus body additionally includes a turntable that rotationally drives the disc, a damper that sandwiches the disc between itself and the turntable, an optical pickup, and a traverse mechanism for moving the optical pickup in the radial direction of the disc.

The tray and the disc holder have such a relation as to be configured so that the tray moves in the horizontal direction to lead the central hole of the disc placed on the disc holder to a position immediately before the turntable, and so that when the tray further moves in the same direction toward the internal end, the disc holder starts descending toward the turntable and loads the disc on the turntable provided on a fixed side so that the disc is sandwiched by the turntable and the clamper.

In addition, Japanese Patent Application Laid-Open No. 63-191361 uses the urging force of a spring to push out the tray in order to eject the disc and includes a damper to prevent the tray from being rapidly pushed out by this urging force.

Despite the reduced speed at which the tray is pushed out, such a disc transfer mechanism is likely to fail to deliver the disc removed from the turntable 9 to a normal position of the tray, so the installation and removal of the disc are not so reliable.

DISCLOSURE OF THE INVENTION

It is an object of the present invention to provide a disc transfer mechanism in which the configuration of the tray to be moved is simple and in which the installation and removal of the disc are reliable even if an urging force of a spring is used to push back the tray.

A disc transfer mechanism according to this invention is characterized in that a damper means for reducing the tray moving speed comprises a first damper interposed between a tray and a base that supports the tray in the direction in which the tray is drawn out and back, in order to reduce the tray moving speed during all the steps in which the tray is moved by the urging force of a spring; and a second damper that operates during the step of delivering the disc set on the turntable to the tray.

This configuration can provide a disc transfer mechanism that can install and remove the disc reliably.

According to the disc transfer mechanism of this invention, there is provided a disc transfer mechanism for setting on a turntable a disc placed on a tray in response to the drawing-out and -back of the tray, comprising: a spring provided between the tray and a base that supports the tray in the direction in which the tray is drawn out and back, in order to urge the tray in the direction in which it is pushed out from the base; and a damper means provided between the base and the tray for reducing the speed of the tray movement effected by the urging force of the spring; the damper means comprising a first damper interposed between the tray and the base to reduce the tray moving speed during all the steps in which the tray is moved by the urging force of the spring, and a second damper that operates during the step of delivering the disc set on the turntable to the tray. Thus, when a disc ejecting operation is started, the tray and an elevating mechanism can be operated slowly and stably.

The disc transfer mechanism comprises: an elevating mechanism for elevating and lowering a turntable in response to the drawing-out and -back of a tray to allow the turntable to be installed on and removed from a disc placed on the tray; a disc receiving member provided at the front end of the tray and adapted to freely slide in the direction in which the tray is drawn out and back, and having a positioning protrusion that can abut on the outer circumference of the disc being loaded while said disc receiving member is urged toward the internal end of the tray; the disc receiving member being arranged to abut on the fixed side when the central hole of the disc placed on the tray reaches a position over said turntable and to move toward the front end of the tray relative to the movement of the tray toward its internal end; a spring provided between the tray and the base that supports the tray in the direction in which the tray is drawn out and back, in order to urge the tray in the direction in which it is pushed out from the base; and a damper means provided between the base and the tray in order to reduce the speed of the tray movement effected by the urging force of the spring; the damper means comprising a first damper interposed between the tray and the base to reduce the tray moving speed during all the steps in which the tray is moved by the urging force of the spring, and a second damper provided between the base that supports the tray in the direction in which the tray is drawn out and back and an elevating mechanism for elevating and lowering the turntable in response to the drawing-out and -back of the tray, in order to operate during the step of delivering the disc set on the turntable to the tray. Thus, by simply providing in the tray a disc receiving member of a simple configuration, the disc can be installed and removed stably as in conventional mechanisms having a tray of a complicated configuration. Moreover, the spring for urging the tray in the direction in which it is pushed out from the base is provided between the tray and the base that supports the tray in the direction in which it is drawn out and back and since the damper means for reducing the speed of the tray movement effected by urging force of the spring is provided between the base and the tray. Consequently, despite the ejection of the disc using the urging force of the spring, the disc can be reliably delivered to the tray from the turntable in such a way as to maintain the correct posture.

The disc transfer mechanism according to a further object of the invention comprises: an elevating mechanism for elevating and lowering a turntable in response to the drawing-out and -back of a tray to allow the turntable to be installed on and removed from a disc placed on the tray; a disc receiving member provided at the front end of the tray and adapted to freely slide in the direction in which the tray is drawn out and back, and having a positioning protrusion that can abut on the outer circumference of the disc being loaded while said disc receiving member is urged toward the internal end of the tray; said disc receiving member being arranged to abut on the fixed side when the central hole of the disc placed on the tray reaches a position over said turntable, and to move toward the front end of the tray relative to the movement of the tray toward its internal end; a spring provided between said tray and the base that supports said tray in the direction in which it is drawn out and back, in order to urge said tray in the direction in which it is pushed out from the base; and a damper means provided between the base and said tray in order to reduce the speed of the tray movement effected by the urging force of the spring; said damper means comprising: a first damper attached to the base that supports the tray in the direction in which the tray is drawn out and back, and engaging with a first rack formed to extend from the front end to internal end of said tray; and a second damper attached to said base and engaging with a second rack formed only at the front end of the tray. Thus, when the ejection of the disc is started, the tray and the elevating mechanism can be operated slowly and stably.

According to a more specific object of the invention, the spring for urging the tray in the direction in which it is pushed out from the base is provided on the top surface of the base and in a tray moving path, such that the spring extends along a path bent around rollers provided on the base. As a result, this mechanism can be compactified compared to conventional apparatuses wherein the spring is provided outside the tray moving path. In addition, this mechanism allows the use of a longer spring than in the prior art.

DESCRIPTION OF THE EMBODIMENTS

Embodiments of this invention will be described below with reference to FIGS. 1 to 12.

Figure 1:
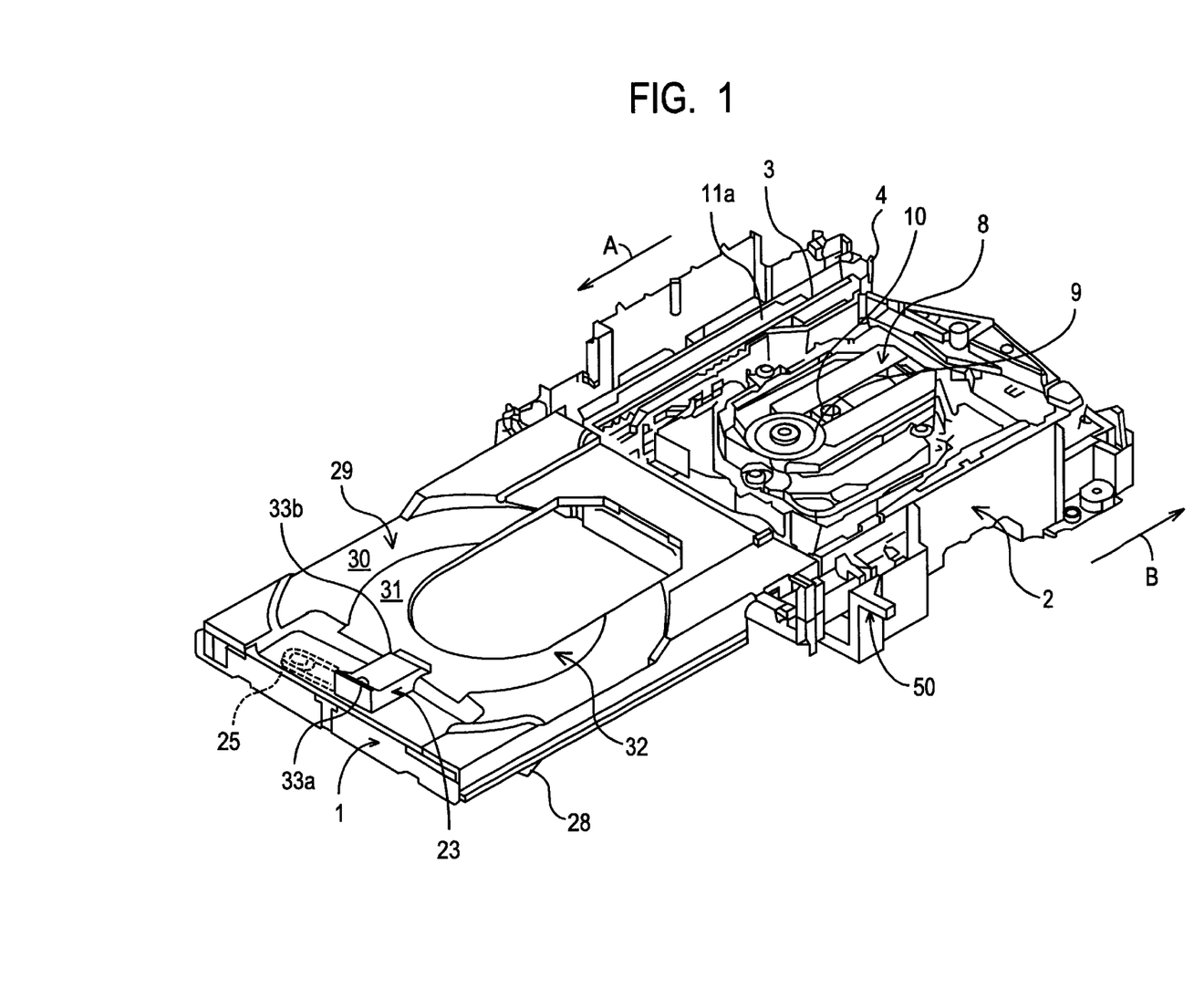
FIG. 1 is a perspective view showing a state in which a tray has been drawn out from a transfer mechanism according to an embodiment of this invention.
Figure 2:
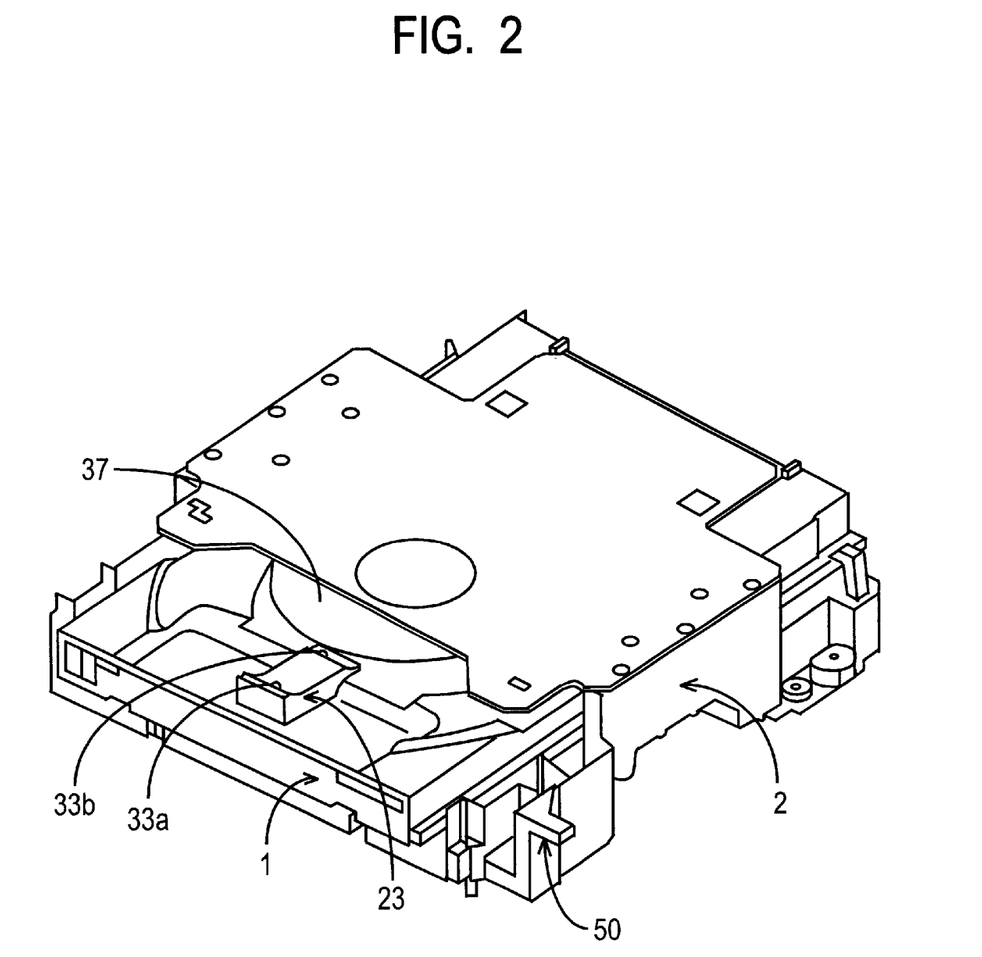
FIG. 2 is a perspective view showing a state in which the tray has been pushed back according to the same embodiment.

FIG. 1 shows a disc transfer mechanism in a disc installation and removal position in which a tray 1 has been drawn out from a base 2. FIG. 2 shows a state in which the tray 1 has moved in the horizontal direction to a loading completion position.

Figure 3:
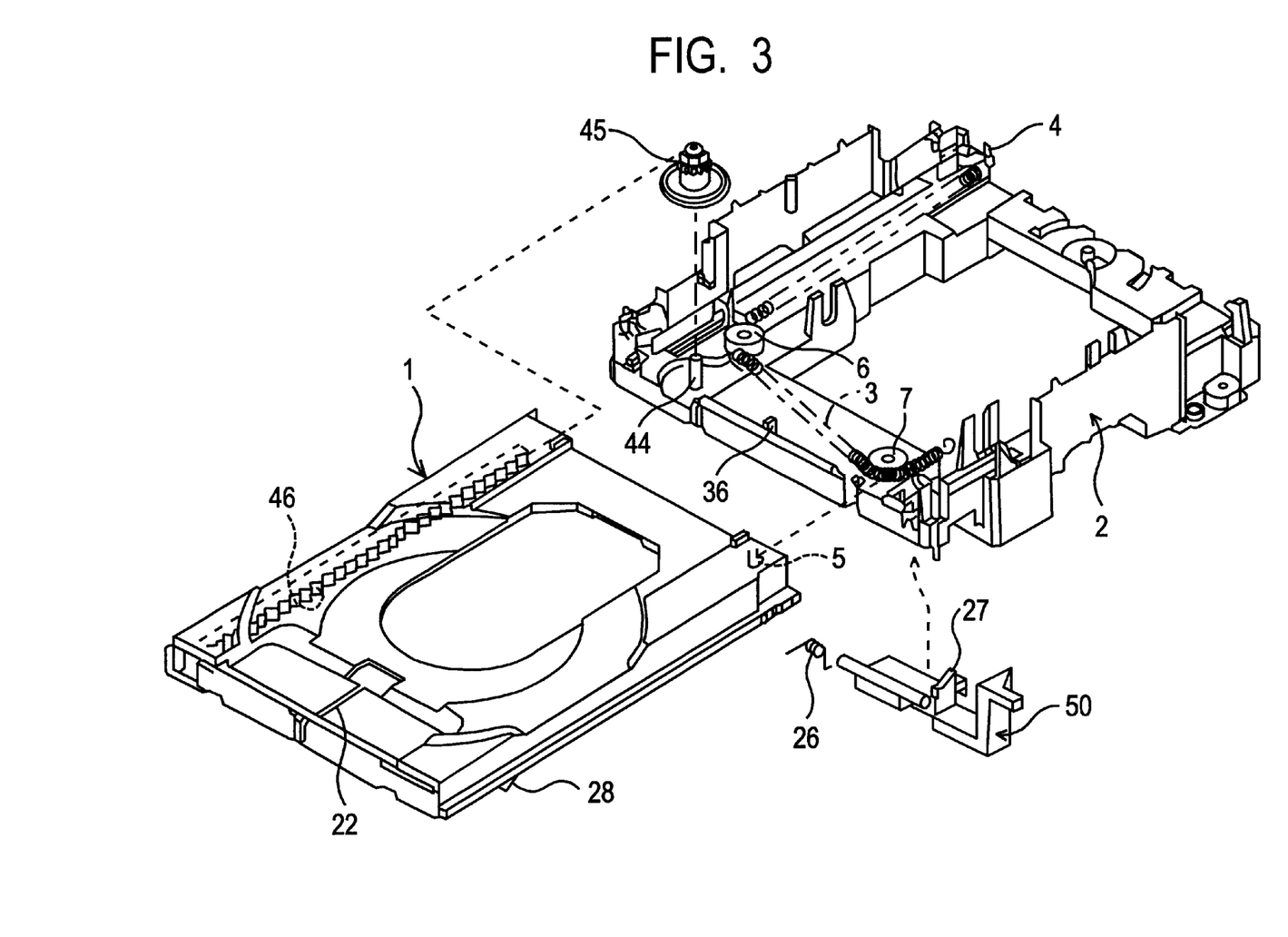
FIG. 3 is an exploded perspective view showing a state in which the tray has been removed from the base according to the same embodiment.

In the disc transfer mechanism according to this embodiment, instead of using a motor, a tension spring 3 is passed between a spring engaging locking portion 4 of the base 2 and a spring engaging locking portion 5 formed on the bottom surface of the internal end portion of the tray 1 in order to drive the tray 1, as shown in FIG. 3. The middle portion of the tension spring 3 passes through grooved rollers 6 and 7 pivotably supported on the base 2.

A damper gear 45 used as a first damper is attached to a shaft 44 formed at the front end of the base 2, with the teeth of the damper gear 45 meshing with a rack 46 formed in the bottom surface of the tray 1 in such a way as to extend from its front end to internal end. A highly viscous grease is applied to the shaft 44.

Reference numeral 8 denotes a playing apparatus that is a unit composed of a turntable 9 rotationally driving a disc, an optical pickup 10, and a traverse mechanism (not shown) for moving the optical pickup in the radial direction of the disc.

Figure 4:
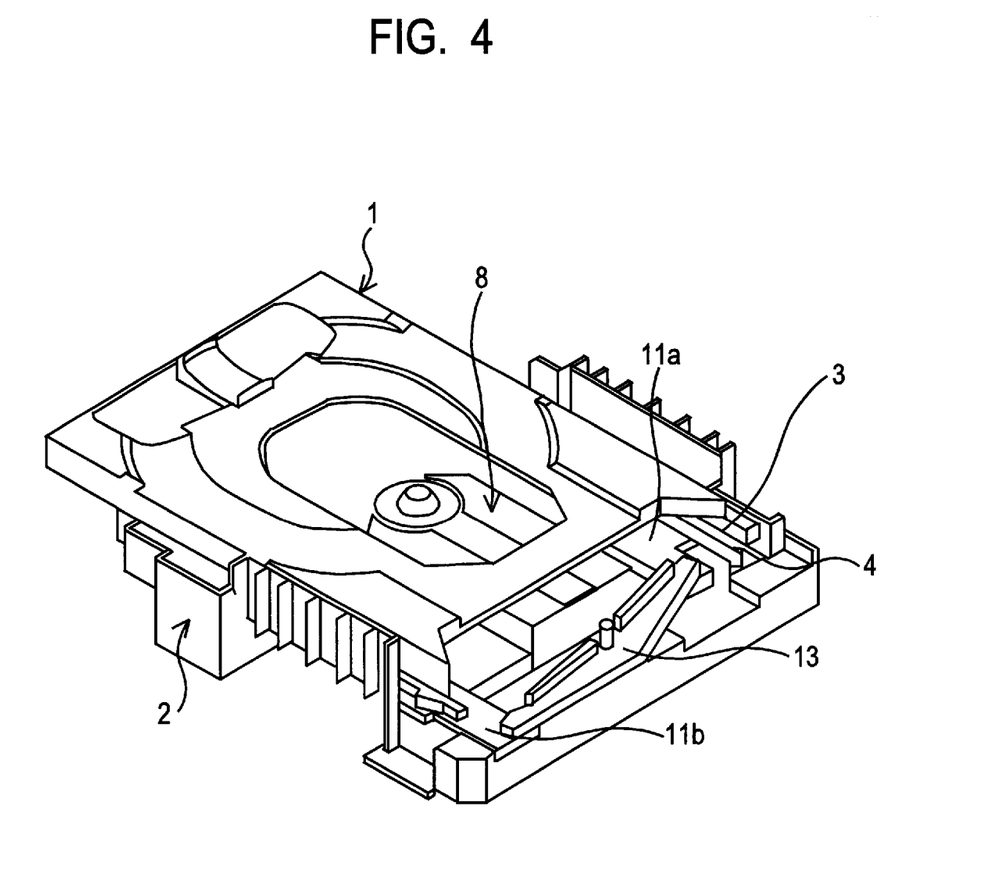
FIG. 4 is a perspective view showing the disc transfer mechanism according to the same embodiment as seen from the rear (the internal end) side.
Figure 5:
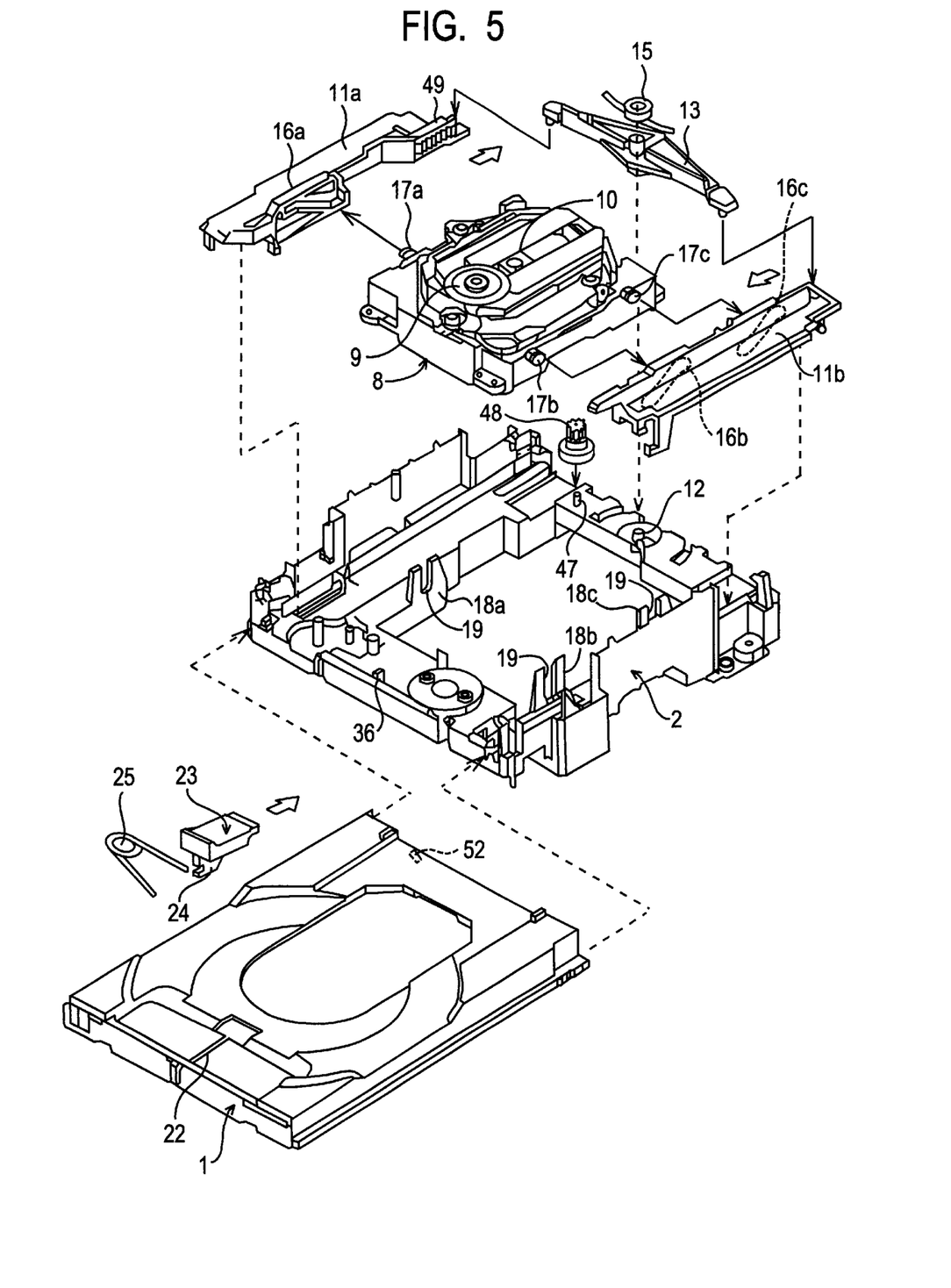
FIG. 5 is an exploded perspective view of the entire disc transfer mechanism according to the same embodiment.

As shown in FIGS. 4 and 5, sliders 11a and 11b are provided on the top surface of the base 2 at positions covered by the tray 1 so as to slide in the direction in which the tray 1 is drawn out and back. The internal ends of the sliders 11a and 11b are coupled together via a coupling lever 13 having its center pivotably supported on a shaft 12 of the base 2. A spring 15 installed between the coupling lever 13 and a protrusion 14 from the base 2 urges the coupling lever 13 in such a way as to push the slider 11a toward the front end of the base 2 (the direction shown by arrow A) and draw the slider 11b toward the internal end of the base 2 (the direction shown by arrow B).

A cam groove 16a is formed in a part of the inside of the slider 11a and close to its front end. Cam grooves 16b and 16c are formed inside the slider 11b and close to its front and internal ends, respectively. The cam grooves 16a and 16b extend in opposite directions, while the cam grooves 16b and 16c extend in the same direction.

Horizontal shafts 17a, 17b, and 17c are formed in a housing of the playing apparatus 8 and engage with vertical grooves 19 in guides 18a, 18b, and 18c formed on the base 2 to support the playing apparatus 8 over the base 2 so as to elevate and lower it. The tips of the horizontal shafts 17a to 17c engage with the cam grooves 16a to 16c.

Figure 6A:
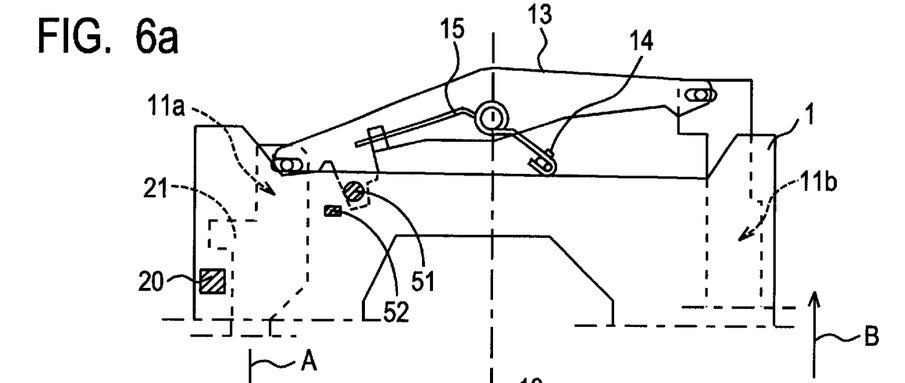
FIG. 6 is a plan view of the neighborhood of a coupling lever during a loading process according to the same embodiment.
Figure 6B:
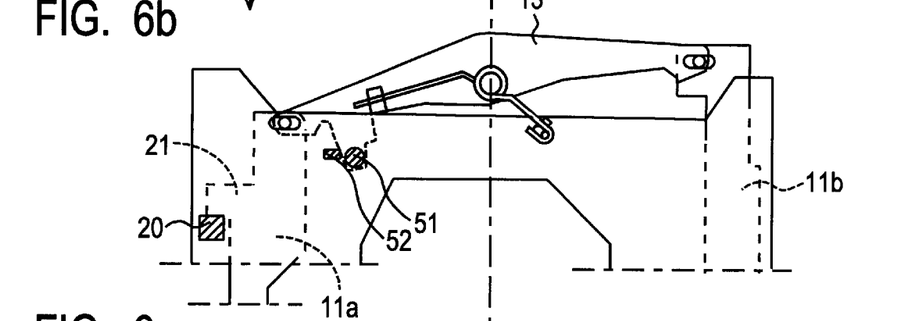
Figure 6C:
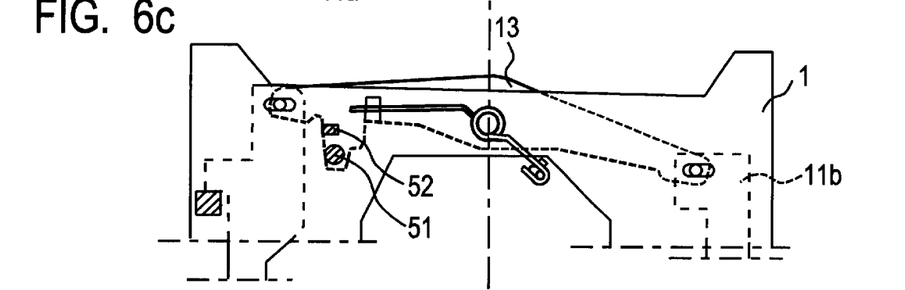

When the tray 1 is pushed toward the internal end of the base 2 against the urging force of the tension spring 3, this configuration allows the sliders 11a and 11b to interlockedly slide through the process shown in FIGS. 6(a) to (c).

Specifically, when the tray 1 is pushed toward the internal end, a protrusion 20 formed on the bottom surface of the tray 1 shown in FIG. 6(a) starts to engage an engaging portion 21 of the slider 11a as shown in FIG. 6(b). When the tray 1 is further pushed in, the slider 11a slides toward the internal end (the direction shown by arrow B) while the slider 11b slide toward the front end (the direction shown by arrow A), as shown in FIG. 6(c). As the sliders 11a and 11b move in the longitudinal direction in response to the pushing-in of the tray 1, the housing of the playing apparatus 8 moves from a lowered position to an elevated position.

Figure 7:
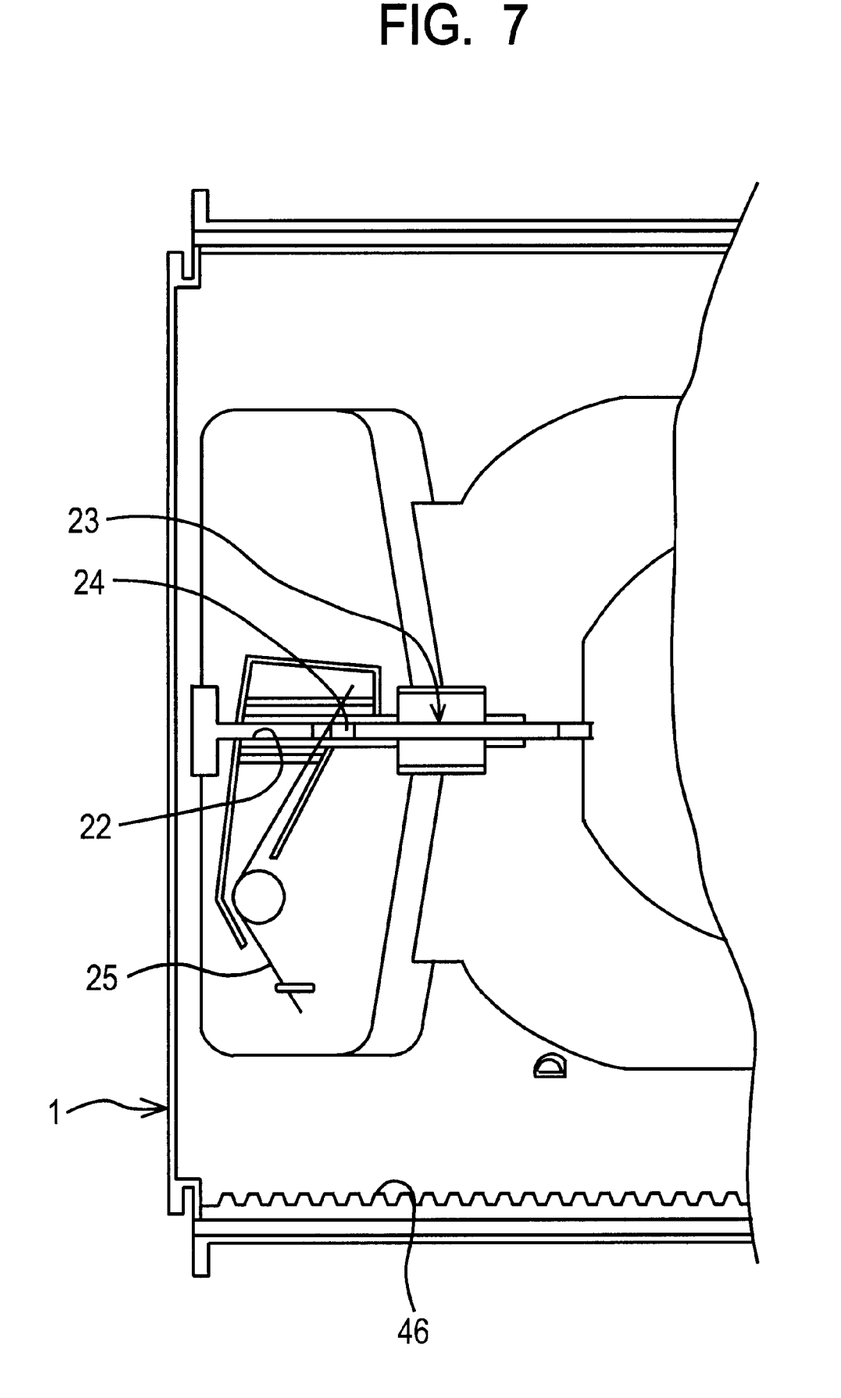
FIG. 7 is a plan view of the bottom surface of the front end portion of the tray according to the same embodiment.

As shown in FIG. 5, a slide hole 22 is drilled at the front end of the tray 1. A protrusion 24 formed on the bottom surface of a disc receiving member 23 is inserted into the slide hole 22, and a spring 25 is installed on the bottom surface of the tray 1 between the tray 1 and the protrusion 24 of the disc receiving member 23 as shown in FIG. 7 to urge the disc receiving member 23 toward the internal end of the tray 1.

When the tray 1 reaches the internal end, a lock claw 27 formed on an operation lever 50 urged by a spring 26 provided on the base 2 is engaged with and locked by an engaging portion 28 provided at the front end of the tray 1. When the operation lever 50 is operated to rotationally move the lock claw 27 against the urging force of the spring 26, the lock claw 27 is disengaged from the engaging portion 28 and the tray 1 returns to the disc installation and removal position due to the urging force of a tension spring 3. In this case, the housing of the playing apparatus 8 moves from the elevated position to the lowered position.

In addition, as shown in FIG. 5, a damper gear 48 used as a second damper is attached to a shaft 47 formed at the internal end of the base 2, with the teeth of the damper gear 48 meshing with a rack 49 formed only at the internal end of the slider 11a. A highly viscous grease is applied to the shaft 47.

The mechanisms for moving the tray 1 in the horizontal direction relative to the base 2 and for elevating and lowering the playing apparatus 8 in response to this horizontal movement are configured as described above. The tray 1 is further configured as follows.

As shown in FIG. 1, the tray 1 includes a large-diameter-disc receiving portion 29 and a small-diameter-disc receiving portion 32 formed in the large-diameter-disc receiving portion 29 and having a receiving surface 31 lower than a large-small-diameter-disc receiving surface 30. Furthermore, large- and small-diameter-disc positioning protrusions 33a and 33b are formed in a disc receiving member 23 slidably provided at the front end of the tray 1.

FIG. 8 shows a process for loading a large-diameter disc 34. The cam grooves 16a, 16b, and 16c are formed as follows.

Figure 8A:
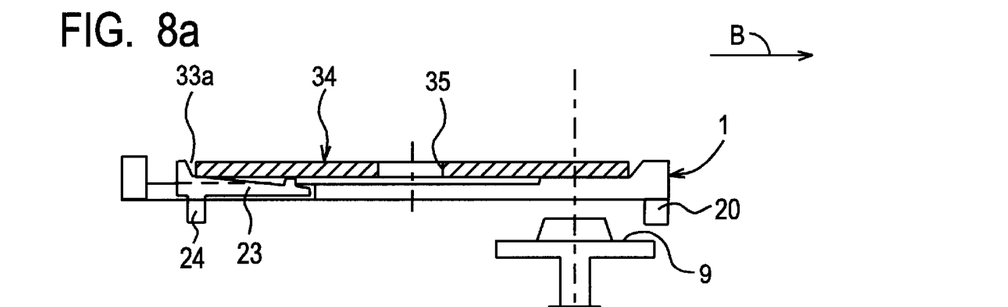
FIG. 8 is a sectional view showing the relationship between the tray, a disc and a turntable observed while a large-diameter disc is being loaded according to the same embodiment.

In FIG. 8(a), the large-diameter disc 34 is placed on the tray 1 drawn to the disc installation and removal position. At this point, the large-diameter disc 34 is placed in the inside defined by the large-diameter-disc positioning protrusion 33a and large-diameter-disc receiving portion 29 of the disc receiving member 23.

When the tray 1 is pushed in against the tension spring 3 until its protrusion 20 abuts on the engaging portion 21 of the slider 11a, and the tray 1 is further pushed in toward the internal end. Then, in response to the horizontal movement of the tray 1 toward the internal end, the slider 11a slides toward the internal end, while the slider 11b slides toward the front end, thereby causing the playing apparatus 8 to start elevating.

Figure 8B:
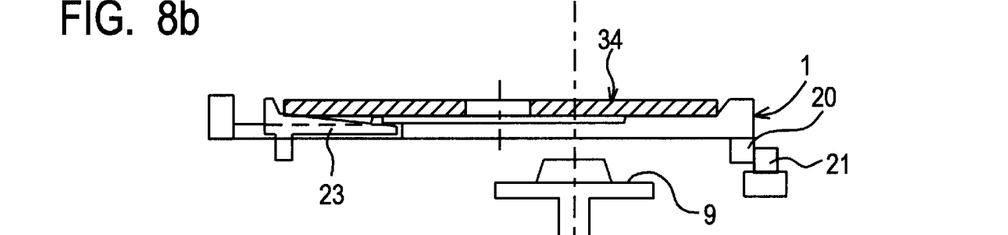
Figure 8C:
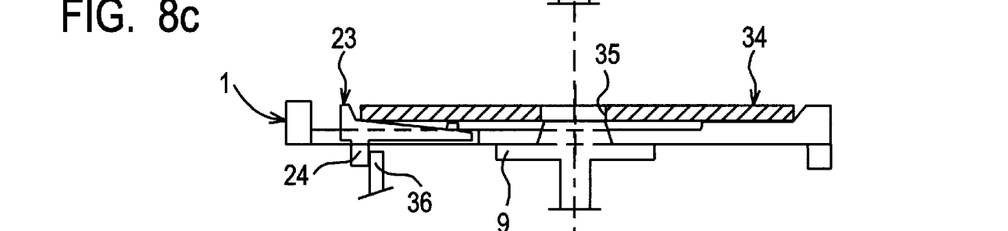

As shown in FIGS. 8(b) to (c), the moment the central hole 35 of the large-diameter disc placed on the tray 1 reaches a position over the turntable 9, the protrusion 24 of the disc receiving member 23 abuts on an engaging piece 36 of the base 2. Then, when the tray 1 is further pushed in toward the internal end, the relative position between the disc receiving member 23 and the tray 1 changes against the urging force of the spring 25, as shown in FIG. 8(d).

That is, until the central hole 35 of the large-diameter disc starts to engage with the turntable 9, the positioning protrusion 33a of the disc receiving member 23 accurately holds the large-diameter disc 34 on the tray 1 so as not to shift. When the turntable 9 starts to engage with the central hole 35 of the large-diameter disc 35, the protrusion 24 of the disc receiving member 23 rests at the same position as in FIG. 8(c) while abutting on the engaging piece 36, whereas only the tray 1 slides toward the internal end, with the relative relationship between the large-diameter disc 34 and the positioning protrusion 33a of the disc receiving member 23 remains unchanged. In these stable conditions, the insertion of the turntable 9 into the central hole 35 of the large-diameter disc is completed as shown in FIG. 8(d).

Figure 8D:
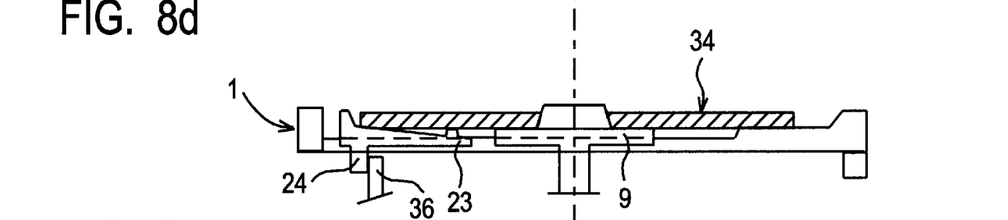
Figure 8E:
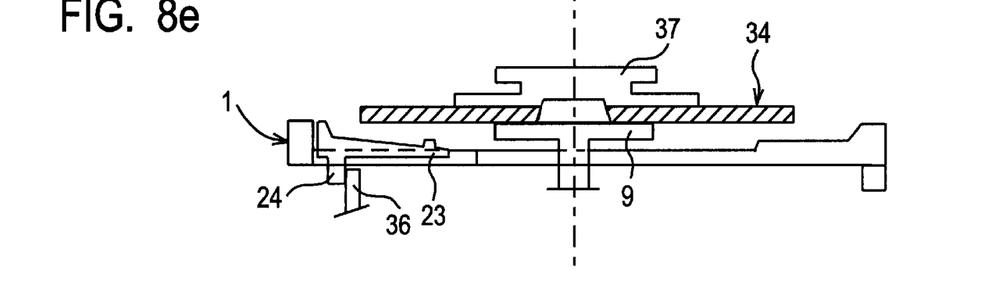

When in FIG. 8(d), the tray 1 is further pushed in toward the internal end, the playing apparatus 8 further elevates to allow the turntable 9 to lift the large-diameter disc 34 from the top surface of the tray 1, and the clamper 37 and the turntable 9 sandwiches the large-diameter disc 34 therebetween to rotationally drive it, as shown in FIG. 8(e).

The terminals of the cam grooves 16a, 16b, and 16c are shaped in such a way that the tray 1 continues horizontal movement toward the internal end for a short period of time after the clamper 37 and the turntable 9 sandwiches the large-diameter disc 34 therebetween, To remove the large-diameter disc 34, the operation lever 50 is operated to disengage the lock claw 27 from the engaging portion 28 of the tray 1 to return the tray 1 to the disc installation and removal position due to the urging force of the tension spring 3. This process is executed in the opposite direction from FIG. 6(d) to 6(a).

Figure 6D:
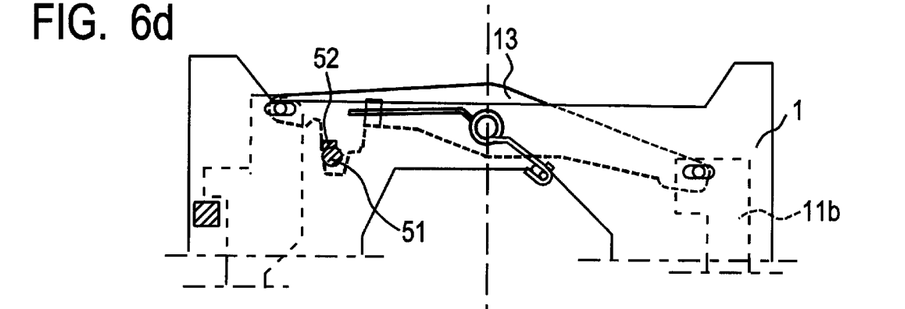

Specifically, in FIG. 6(d) in which loading has been completed, a protrusion 51 formed on the coupling lever 13 engages with a protrusion 52 formed on the bottom surface of the tray 1. The operation lever 50 is operated to disengage the lock claw 27 from the engaging portion 28 of the tray 1. Then, using as a power source the force of the spring 15 urging the coupling lever 13 as shown in FIG. 6(a) and the force of the tension spring 3 urging the tray 1, the tray 1 starts slow movement while being decelerated by the damper force of the damper gears 48 and 45, until the protrusion 51 is disengaged from the protrusion 52. In this case, the slow sliding movement of the sliders 11a and 11b causes the playing apparatus 8 to slowly lower, thereby ensuring that the large-diameter disc 34 can be delivered to the tray 1 from the turntable 9 while maintaining the correct posture.

When the large-diameter disc 34 passes through the position at which it is delivered to the tray 1 while maintaining the correct posture and the protrusion 52 is disengaged from the protrusion 51, the damper gear 48 subsequently stops acting on the transfer system for the tray 1. Thus, using the urging force of the tension spring 3, the tray 1 is pushed out to the position shown in FIG. 1 while being decelerated by the damper gear 45.

Although the relative relationship between the tray 1 and the disc receiving member 23 and the turntable 9 that can stably load the large-diameter disc 34 has been described above, this invention is also configured as follows to enable a small-diameter disc to be loaded stably.

In the tray 1, the small-diameter-disc placement surface 31 is formed below the large-diameter-disc placement surface 30. The timing with which the tray 1 is drawn out and back and with which the playing apparatus 8 elevates and lowers are the same for both the large- and small-diameter disc.

If the center 38 of the small-diameter-disc receiving portion 32 is identical to the center 39 of the large-diameter-disc receiving portion 29, the difference in the height of the discs causes the tray 1 to shift between the position at which the bottom surface of small-diameter disc aligns with the top surface of the turntable 9 and the position at which the turntable surface aligns with the bottom surface of the small-diameter disc. Accordingly, the center of the turntable 9 fails to align with a center hole of the disc, thereby precluding the small-diameter disc from being loaded stably.

Figure 9:
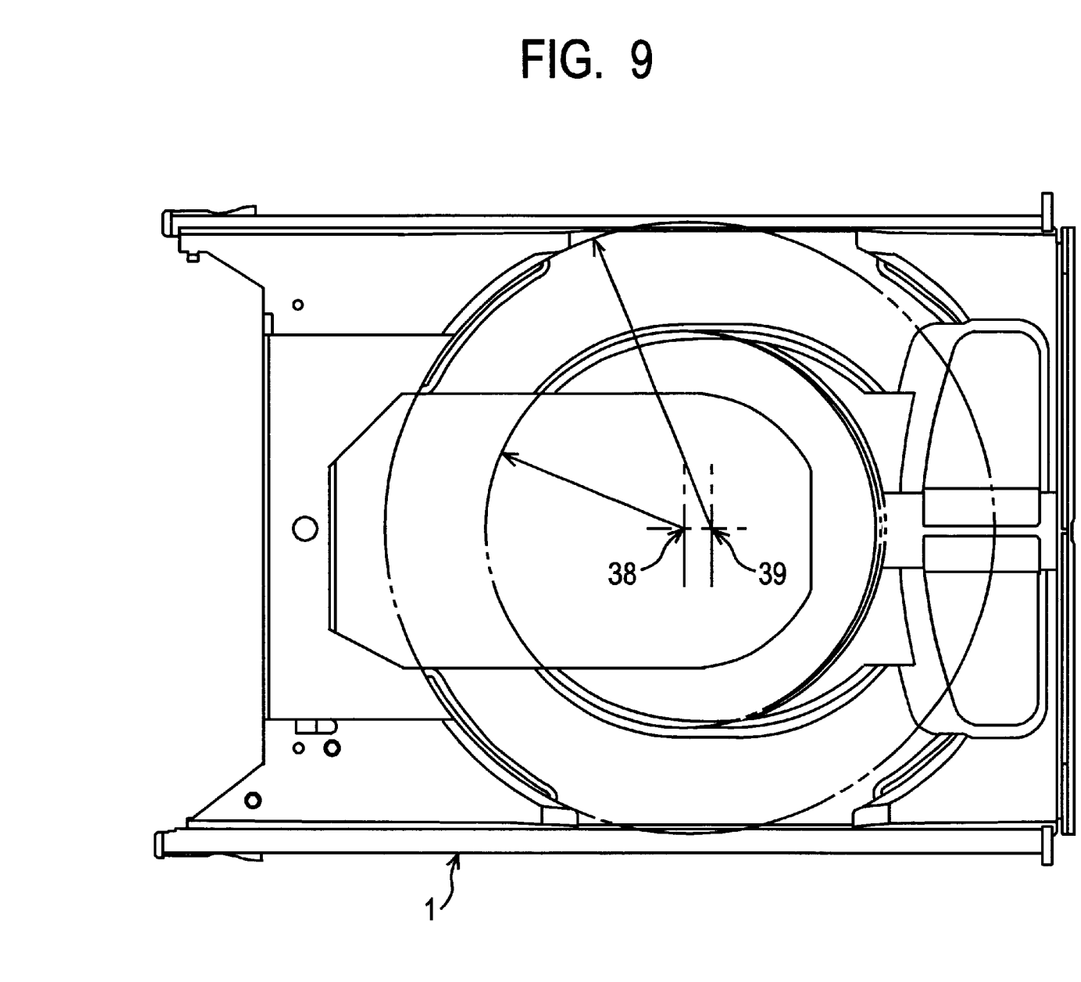
FIG. 9 is a plan view of the tray according to the same embodiment.

Thus, as shown in FIG. 9, this embodiment is formed in such a way that the center 38 of the small-diameter-disc receiving portion 32 is located closer to the internal end than the center 39 of the large-diameter-disc receiving portion 29 to enable the small-diameter disc to be loaded stably.

By offsetting the centers 38 and 39 of the small- and large-diameter-disc receiving portions 32 and 29 from each other in this manner, the center of the turntable 9 aligns with the central hole of the disc despite the movement of the tray 1, thereby enabling stable loading.

FIGS. 10(a) to (e) show a process for loading a small-diameter disc 40 and correspond to the process for loading the large-diameter disc 34, which is shown in FIGS. 8(a) to (e).

Figure 10A:
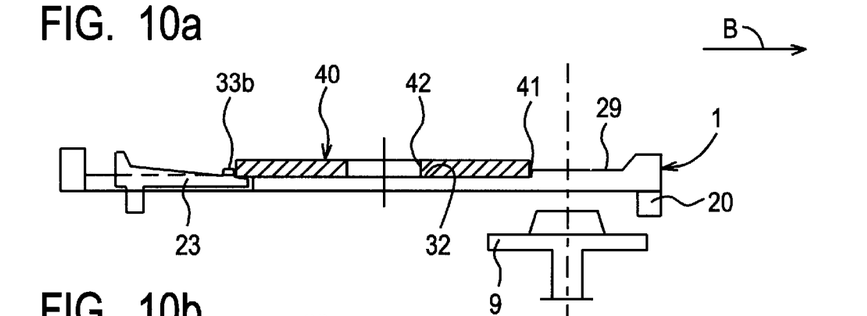
FIG. 10 is a sectional view showing the relationship between the tray, the disc and the turntable observed while a small-diameter disc is being loaded according to the same embodiment.

In FIG. 10(a), a receiving portion 33b of the disc receiving member 23 positions the front surface of the small-diameter disc 40, while a step 41 between the large- and small-diameter-disc placement surfaces 30 and 31 of the tray 1 positions its rear surface.

Figure 10B:
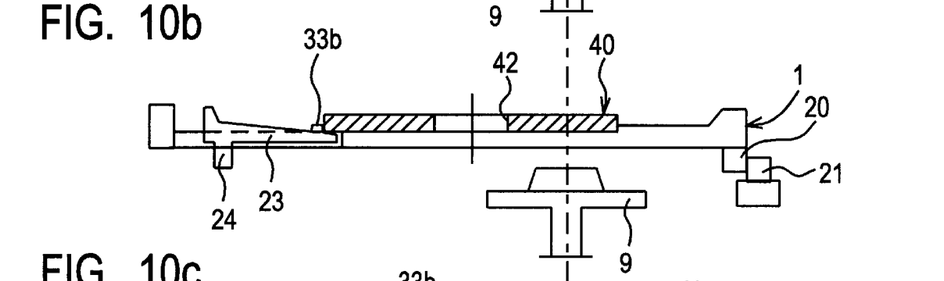

Next, the playing apparatus 8 starts to elevate as shown in FIG. 10(b).

Figure 10C:
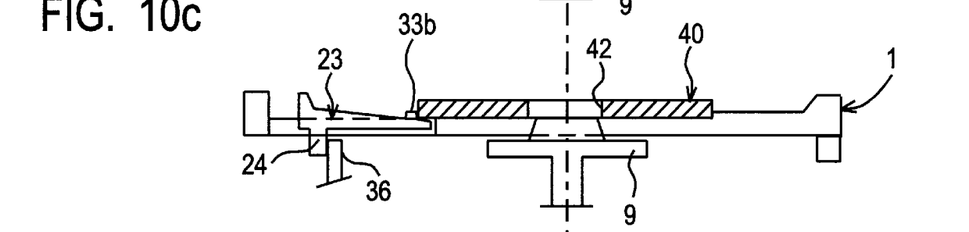

Since the small-diameter disc 40 is located below the large-diameter disc 34, the central hole 42 of the small-diameter disc 40 aligns with the center of the turntable 9 before the position shown in FIG. 8(c) is reached, as shown in FIG. 10(c). The playing apparatus 8 slightly elevates to align the bottom surface of the small-diameter disc 40 with the top surface of the turntable 9.

The tray 1 moves between the position shown in FIG. 10(c) and the position shown in FIG. 8(c), so the center 38 of the small-diameter-disc receiving surface 31 is correspondingly located closer to the internal end of the tray 1 than the center 39 of the large-diameter disc receiving surface 30.

Figure 10D:
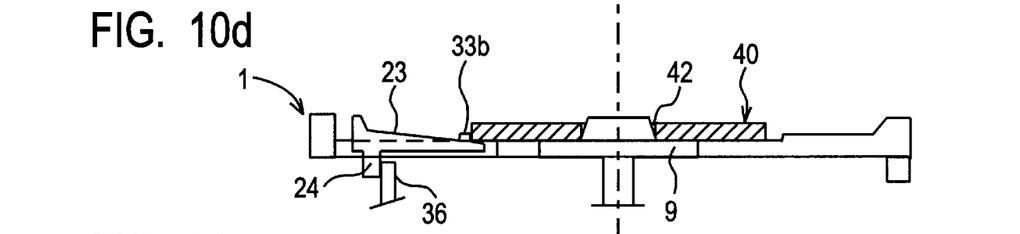

In addition, the protrusion 24 of the disc receiving member 23 abuts on the engaging piece 36 of the base 2. Then, when the tray 1 is further pushed in toward the internal end, the relative position between the disc receiving member 23 and the tray 1 changes against the urging force of the spring 25, as shown in FIG. 10(d). Consequently, the position of the disc receiving member 23 remains unchanged despite the further pushing-in of the tray 1.

The position in FIG. 8(c) is only a passing point for the small-diameter disc 40. This is also applicable to the position for the large-diameter disc in FIG. 8(d). Since the small-diameter disc is located below the large-diameter disc, the position at which the turntable 9 is located under the bottom surface of the small-diameter disc 40 before the position in FIG. 8(d) is reached. Again, the centers are prevented from mutual offset because the position of the disc receiving surface remains unchanged.

Figure 10E:
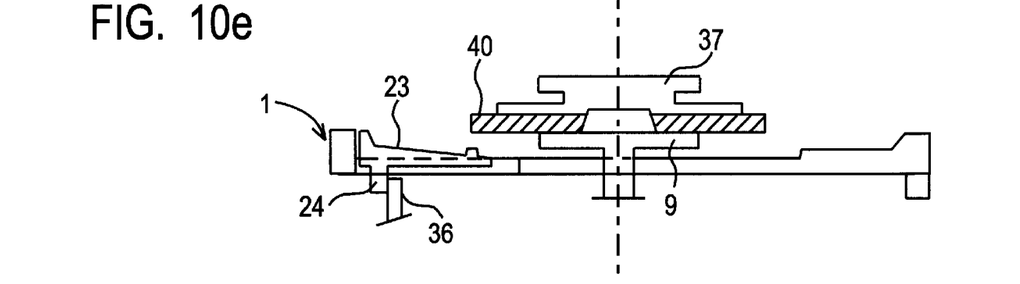

Furthermore, at the position in FIG. 10(e), the clamper 37 sandwiches the small-diameter disc 40 to enable it to be played.

The ejection process is similarly executed in the reverse order, and despite its movement during the lowering of the turntable 9 between FIGS. 10(e) and (d), the tray 1 can be returned to a predetermined position because the position of the disc receiving surface remains unchanged. In addition, in the process for ejecting the small-diameter disc, the tray 1 starts to move slowly due to the large damper force of the damper gears 48 and 45, thereby ensuring that the small-diameter disc 40 can be reliably delivered to the tray 1 from the turntable 9 in such a way that the disc maintains the correct posture.

As described above, the centers of the large- and small-diameter-disc receiving surfaces are mutually offset to allow the center of the turntable 9 to align with the central hole of the disc for operation despite the movement of the tray.

Figure 11:
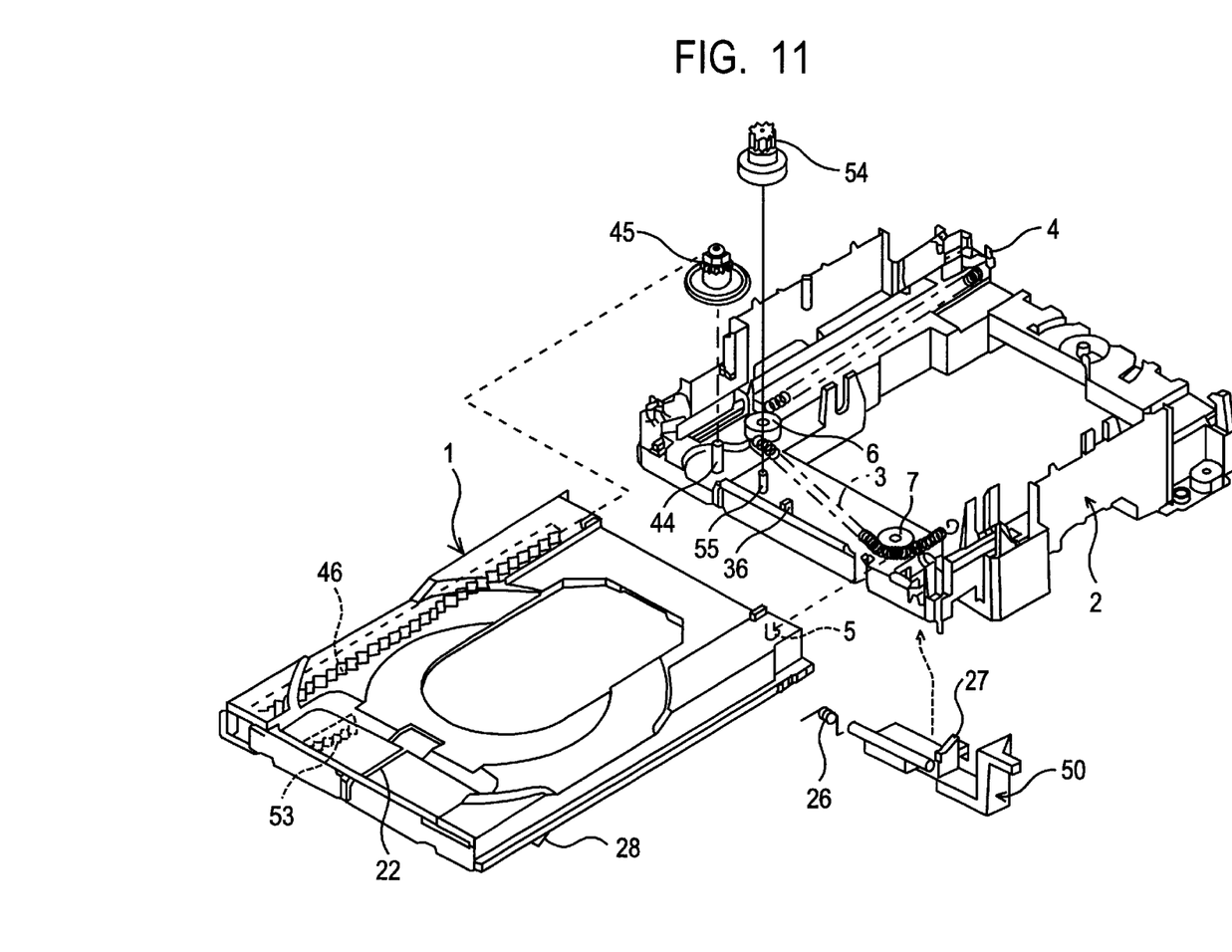
FIG. 11 is an exploded perspective view of the integral part of another embodiment.

Although in the above embodiment, the damper gear 48 meshing with the slider 11a and the damper gear 45 meshing with the rack 46 in the tray 1 are used to appropriately restrict the moving speed of the tray 1 during ejection, similar effects can be obtained by using both the damper gear 45 and a damper gear 54 that engages with a rack 53 formed only at the front end of the tray 11 as shown in FIG. 1. The damper gear 54 is mounted on a shaft 55 on the base 2, with highly viscous grease applied to the shaft 55.

Figure 12:
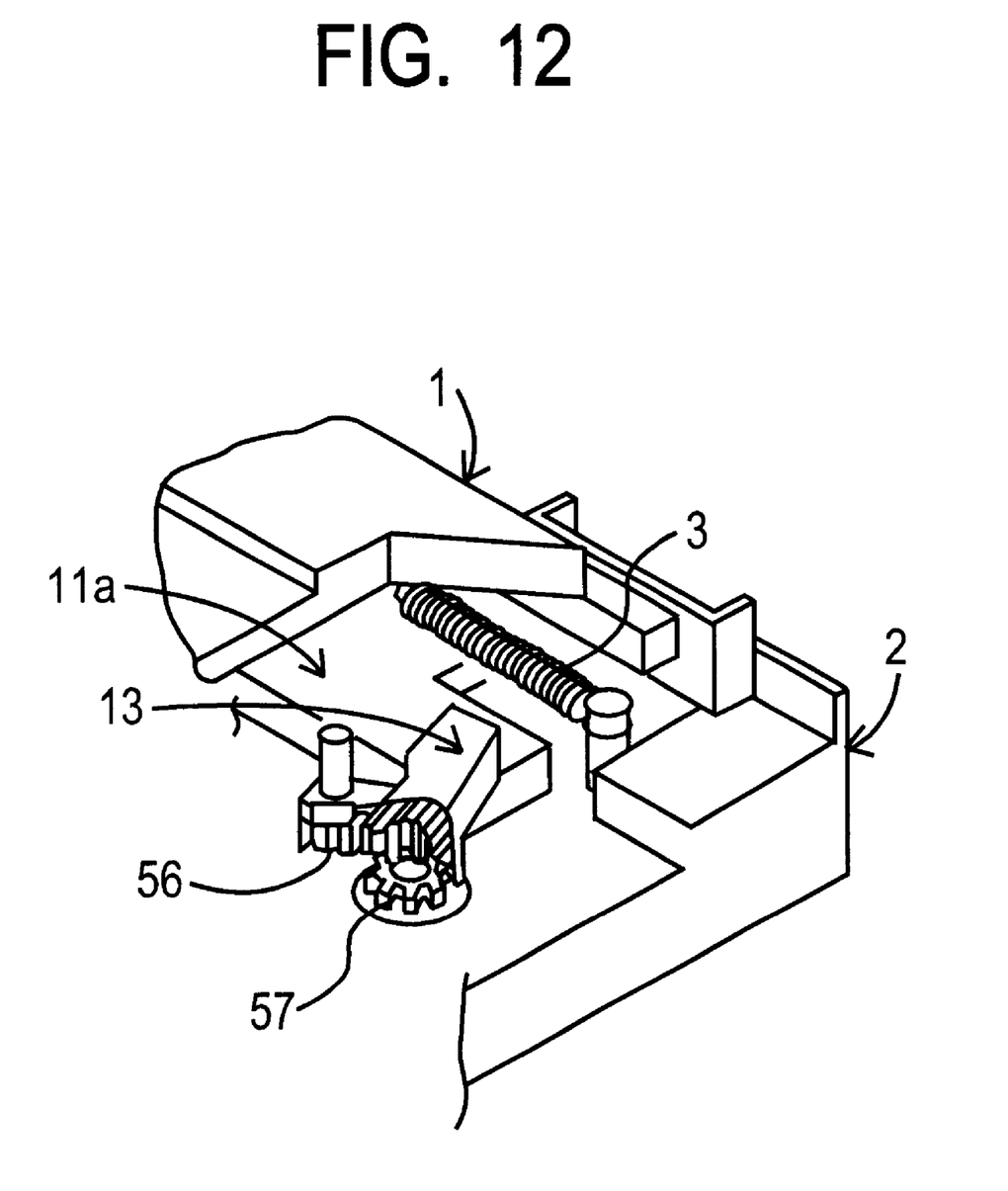
FIG. 12 is an exploded perspective view of the integral part of yet another embodiment.

In addition, similar effects can be expected by forming teeth 56 on the rear surface of the coupling lever 13, as shown in FIG. 12, and using a damper gear 57 that engages with the teeth 56 together with the damper gear 45.

What is claimed is:

1. A disc transfer mechanism for an information disc drive comprising:

a base including an engaging member, a tray sliding in a horizontal direction and in a front-and-back direction with respect to the base, and an elevating mechanism for vertically elevating and lowering a turntable via a linkage mechanism which operates in response to the drawing-out and -back of the tray to allow the turntable to be installed on and removed from a disc located on the tray;

a disc receiving member provided at the front end of the tray and adapted to freely slide in the direction in which the tray is drawn out and back, and having a positioning protrusion that can abut an outer circumference of a disc being loaded while the disc receiving member is urged toward an internal end of the tray;

the disc receiving member being arranged to abut the engaging member of the base when a central hole of a disc located on the tray reaches a position over a central axis of the turntable;

a spring provided between the tray and the base that support said tray in the directon in which it is drawn out and back, in order to urge the tray in the direction in which it is pushed out from the base; and a damper means for controlling movement of the tray and the elevating mechanism;

the damper means comprising;

a first damper interposed between said tray and the base that supports the tray in the direction in which the tray is drawn out and back, in order to reduce the tray moving speed during all the steps in which said tray is moved by the urging force of the spring; and a second damper interposed between the base that supports the tray in the direction in which the tray is drawn out and back and the elevating mechanism for elevating and lowering the turntable in response to the drawing-out and -back of the tray, to operate together with the first damper only during the step of delivering a disc between the turntable and the tray.

2. A disc transfer mechanism according to claim 1, wherein the spring for urging the tray in the direction in which it is pushed out from the base is provided on the top surface of the base in a tray moving path, such that the spring extends along a path bent around rollers provided on the base.

* * * * *